(12) United States Patent
Liu et al.

(10) Patent No.: US 11,605,163 B2
(45) Date of Patent: Mar. 14, 2023

(54) AUTOMATIC ABNORMAL CELL RECOGNITION METHOD BASED ON IMAGE SPLICING

(71) Applicant: Wuhan University, Wuhan (CN)

(72) Inventors: Juan Liu, Wuhan (CN); Jiasheng Liu, Wuhan (CN); Zhuoyu Li, Wuhan (CN); Chunbing Hua, Wuhan (CN)

(73) Assignee: WUHAN UNIVERSITY, Wuhan (CN)

( * ) Notice: Subject to any disclaimer, the term of this patent is extended or adjusted under 35 U.S.C. 154(b) by 290 days.

(21) Appl. No.: 17/002,751

(22) Filed: Aug. 25, 2020

(65) Prior Publication Data

US 2021/0065367 A1    Mar. 4, 2021

(30) Foreign Application Priority Data

Aug. 26, 2019 (CN) .......................... 201910790102.0

(51) Int. Cl.
*G06T 3/40* (2006.01)
*G06T 7/00* (2017.01)

(52) U.S. Cl.
CPC .......... *G06T 7/0012* (2013.01); *G06T 3/4046* (2013.01); *G06T 3/4084* (2013.01); *G06T 2207/20012* (2013.01); *G06T 2207/20081* (2013.01); *G06T 2207/20084* (2013.01); *G06T 2207/20104* (2013.01); *G06T 2207/20132* (2013.01); *G06T 2207/20221* (2013.01); *G06T 2207/30024* (2013.01)

(58) Field of Classification Search
None
See application file for complete search history.

(56) References Cited

U.S. PATENT DOCUMENTS

| | | | | |
|---|---|---|---|---|
| 3,572,890 A | * | 3/1971 | Adamik ............... | G01N 1/2813 359/396 |
| 4,965,725 A | * | 10/1990 | Rutenberg ............. | G16H 50/20 706/924 |
| 5,333,207 A | * | 7/1994 | Rutenberg .......... | G06F 3/04842 382/311 |
| 5,625,705 A | * | 4/1997 | Recht ........................ | G06T 7/48 382/128 |
| 5,655,029 A | * | 8/1997 | Rutenberg ........... | G02B 21/365 382/311 |

(Continued)

*Primary Examiner* — Tsung Yin Tsai
(74) *Attorney, Agent, or Firm* — Matthias Scholl P.C.; Matthias Scholl (57) ABSTRACT

An automatic abnormal cell recognition method, the method including: 1) scanning a slide using a digital pathological scanner and obtaining a cytological slide image; 2) obtaining a set of centroid coordinates of all nuclei that is denoted as CentroidOfNucleus by automatically localizing nuclei of all cells in the cytological slide image using a feature fusion based localizing method; 3) obtaining a set of cell square region of interest (ROI) images that are denoted as ROI_images; 4) grouping all cell images in the ROI_images into different groups based on sampling without replacement, where each group contains ROW×COLUMN cell images with preset ROW and COLUMN parameters; obtaining a set of splice images; and 5) classifying all cell images in the splice image simultaneously by using the splice image as an input of a trained deep neural network; and recognizing cells classified as abnormal categories.

17 Claims, 10 Drawing Sheets

(56) References Cited

U.S. PATENT DOCUMENTS

| | | | | |
|---|---|---|---|---|
| 5,740,270 A | * | 4/1998 | Rutenberg | G06N 3/04 |
| | | | | 600/300 |
| 2009/0213214 A1 | * | 8/2009 | Yamada | G06T 7/0012 |
| | | | | 348/80 |
| 2016/0305947 A1 | * | 10/2016 | Pierce | C07K 16/2818 |
| 2019/0272638 A1 | * | 9/2019 | Mouton | G06V 20/698 |

* cited by examiner

| Lay_name | Output_size | 22-layer |
|---|---|---|
| Conv1 | $(\alpha \times L \times \text{rows}/2) \times (\alpha \times L \times \text{column}/2)$ | $7 \times 7, 64\beta$, stride 2 |
| Conv2_x | $(\alpha \times L \times \text{rows}/4) \times (\alpha \times L \times \text{column}/4)$ | $3 \times 3$ max pool, stride 2 $\begin{bmatrix} 3 \times 3, 64\beta \\ 3 \times 3, 64\beta \end{bmatrix} \times 2$ |
| Conv3_x | $(\alpha \times L \times \text{rows}/8) \times (\alpha \times L \times \text{column}/8)$ | $\begin{bmatrix} 3 \times 3, 128\beta \\ 3 \times 3, 128\beta \end{bmatrix} \times 2$ |
| Conv4_x | $(\alpha \times L \times \text{rows}/16) \times (\alpha \times L \times \text{column}/16)$ | $\begin{bmatrix} 3 \times 3, 256\beta \\ 3 \times 3, 256\beta \end{bmatrix} \times 2$ |
| Conv5_x | $(\alpha \times L \times \text{rows}/32) \times (\alpha \times L \times \text{column}/32)$ | $\begin{bmatrix} 3 \times 3, 512\beta \\ 3 \times 3, 512\beta \end{bmatrix} \times 2$ |
| Conv6_x | $(\alpha \times L \times \text{rows}/64) \times (\alpha \times L \times \text{column}/64)$ | $\begin{bmatrix} 3 \times 3, 512\beta \\ 3 \times 3, 512\beta \end{bmatrix} \times 2$ |
| FC_7 | $1 \times 1$ | Average pool, $3 \times \text{rows} \times \text{column-d}$ fc, softmax |

FIG. 10

AUTOMATIC ABNORMAL CELL RECOGNITION METHOD BASED ON IMAGE SPLICING

CROSS-REFERENCE TO RELATED APPLICATIONS

Pursuant to 35 U.S.C. § 119 and the Paris Convention Treaty, this application claims foreign priority to Chinese Patent Application No. 201910790102.0 filed Aug. 26, 2019, the contents of which, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND

The disclosure relates to the field of image analysis, and more particularly to an automatic abnormal cell recognition method for a pathological cell image.

At present, deep learning has been used in the field of intelligent disease diagnosis. Conventional methods for recognizing abnormal cells using deep learning include obtaining regions of interest (ROI) in a pathological cell image, and then classifying the ROI images by using a deep network. On one hand, the ROI images are required to include a plurality of cells in order to improve the efficiency of an algorithm, which is in conflict with the idea that a pathological cell image includes a single cell as an object of study, so the method cannot ensure the recognition precision of abnormal cells. On the other hand, the automatic cell localization is carried out to generate and classify the ROI images. But the cells are isolated from their neighboring environment, so that a classification model cannot effectively compare pathological features of different cells in the same sample. Further, it is difficult to determine whether an abnormal lesion occurs by only observing a single cell. Therefore, these methods cannot recognize the abnormal cells accurately.

SUMMARY

The disclosure provides a novel automatic abnormal cell recognition method based on image splicing to improve the recognition efficiency and recognition precision of abnormal cells thus providing a valuable reference for diagnosis.

The disclosure provides an automatic abnormal cell recognition method based on image splicing, the method comprising:
1) scanning a slide using a digital pathological scanner and obtaining a cytological slide image;
2) obtaining a set of centroid coordinates of all nuclei that is denoted as CentroidOfNucleus by automatically localizing nuclei of all cells in the cytological slide image using a feature fusion based localizing method;
3) obtaining a set of square cell region of interest (ROI) images that are denoted as ROI_images, wherein each square cell ROI image corresponds to a cell in the slide, and is determined with a Centroid_i as a center of the each square cell ROI image and a fixed length L as a side length of the each square cell ROI image;
4) grouping all cell images in the ROI_images into different groups based on sampling without replacement, wherein each group contains ROW×COLUMN cell images with preset ROW and COLUMN parameters; obtaining a set of splice images wherein a splice image with length being ROW×L and width being COLUMN×L is generated by randomly splicing the ROW×COLUMN cell images in the same group into ROW rows and COLUMN columns; and
5) classifying all cell images in the splice image simultaneously by using the splice image as an input of a trained deep neural network; and recognizing cells classified as abnormal categories.

The following advantages are associated with the automatic abnormal cell recognition method based on image splicing of the disclosure:

1. An automatic nucleus localization algorithm based on multi-source feature fusion can automatically fuse a SpeededUp Robust Features (SURF) feature and a maximally stable extreme region (MSER) feature of pixel points in a pathological cell image, thereby improving the localization precision and localization efficiency of the nucleus significantly.

2. In the disclosure, to realize self-adaptive adjustment of numbers of rows and columns of image splicing, two parameters, i.e., $\alpha$ and $\beta$ are added to the deep network to control the resolution and the width of a network structure, so that the method of the disclosure has higher flexibility and wider applicability.

3. Splicing cell images from the same sample provides a neighboring environment of large scope for cell classification and adds pathological feature reference and comparison of other cells of the same sample for a classification process, thereby effectively improving the detection precision of abnormal cells.

4. The total multiply-accumulate calculation cost (MACC) of the deep neural network model is increased after image splicing. Different cell images participating in splicing share calculation, thus compared with the traditional deep network taking a single-cell image as an input, the MACC averaged to each cell image is reduced to half of the original in a case of reaching a same classification precision, thereby greatly improving an efficiency of the classification model.

DETAILED DESCRIPTIONS

To further illustrate the disclosure, embodiments detailing an automatic abnormal cell recognition method based on image splicing are described below. It should be noted that the following embodiments are intended to describe and not to limit the disclosure.

According to the method of the disclosure, all cells in a pathological cell image may be automatically localized based on an efficient localization algorithm and corresponding ROI images are generated; then, the ROI images are spliced in groups to generate cell splice images; finally, the splice images are classified by using a deep network model. In this way, the recognition of abnormal cells is realized. The method of the disclosure is executed by a computer processor.

Figure 1:
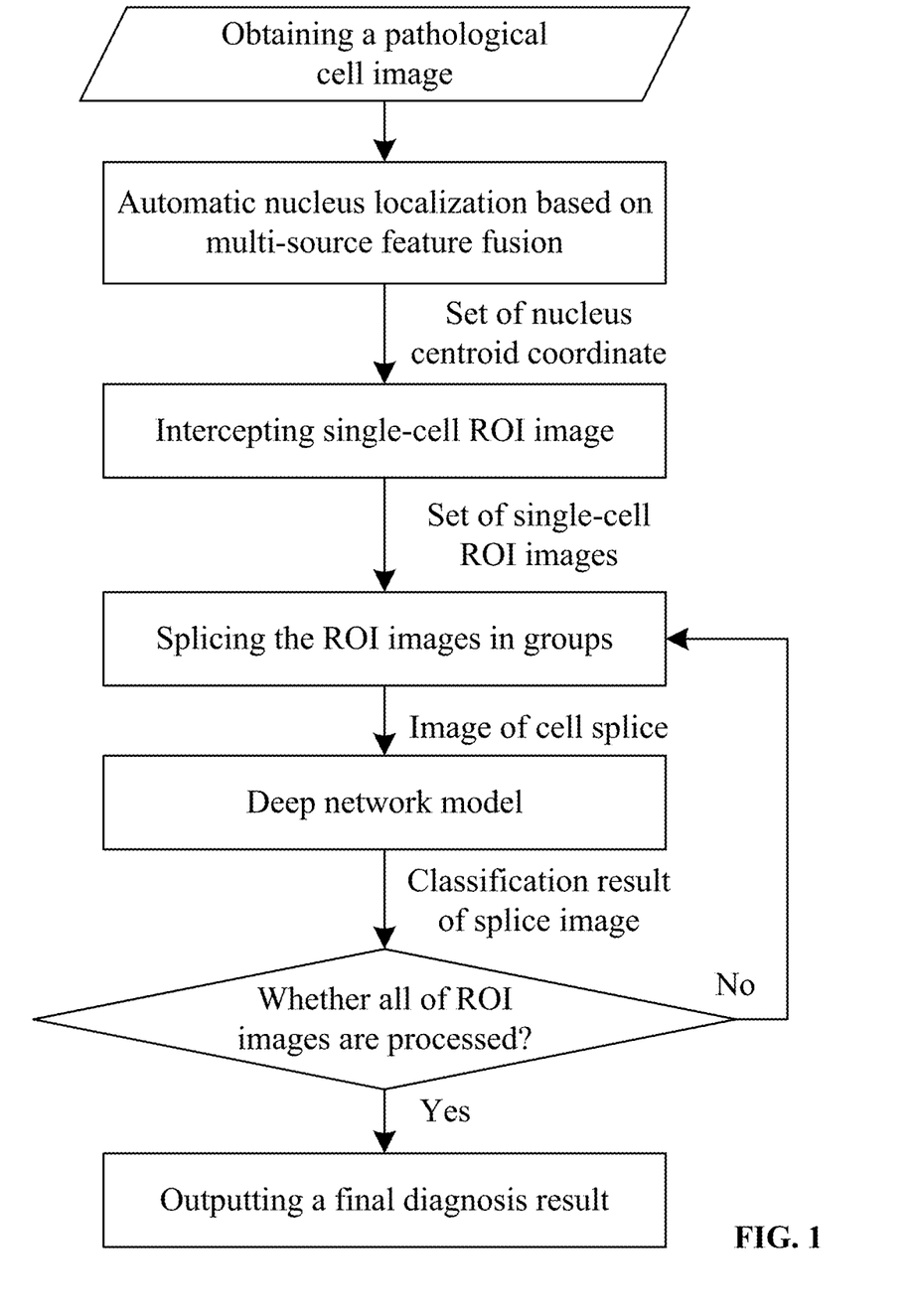
FIG. 1 is a flowchart of an automatic abnormal cell recognition method based on image splicing according to one embodiment of the disclosure.

As shown in FIG. 1, an automatic abnormal cell recognition method based on image splicing comprises the following steps:

1) scanning a slide using a digital pathological scanner and obtaining a cytological slide image;

2) obtaining a set of centroid coordinates of all nuclei that is denoted as CentroidOfNucleus by automatically localizing nuclei of all cells in the cytological slide image using a feature fusion based localizing method.

In this example, the nuclei of all cells in the cytological slide image are automatically localized by using a feature fusion based localizing method, which comprises:

2.1) obtaining a set of stable extreme regions denoting as msers by automatically localizing all stable extreme regions in the cytological slide image based on maximally stable extreme region (MSER) algorithm, each region in the msers complies with the condition that an area thereof reaches a stable maximum and is within a given threshold range.

The process of the MSER algorithm is as follows: an image is binarized by using a continuously changing threshold changing from 0 to 255 sequentially, so that the binarized image undergoes a process from all-black to all-white which is similar to an aerial view of a constantly rising water level. In this process, the areas of some connected regions change little along with the increase of the threshold, such regions are referred to as a maximally stable extreme region (mser), and its mathematical definition is as follows:

$$\frac{|R_{i+delta} - R_{i-deta}|}{|R_i|} < maxVari;$$

$$minArea < R_i < maxArea.$$

In the above formula, Ri refers to an area of an i-th connected region, and deta refers to a tiny threshold change (water injection). When $$\frac{|R_{i+deta} - R_{i-deta}|}{|R_i|}$$

is smaller than a given threshold maxVari and the area of the connected region is within a range between a minimum area threshold minArea and a maximum area threshold maxArea, it is considered that the region is a mser satisfying requirements. In the MSER algorithm of this example, the value of the deta is 1, the value of the maxVari is 0.77, the value of the minArea is 120, and the value of the maxArea is 1000.

2.2) Localizing a set of key points in the cytological slide image based on a SpeededUp Robust Features (SURF) algorithm and denoting the set of key points as CandidateNucleus, each key point represents a centroid of a candidate nucleus.

In a SURF algorithm, all points of interest are generated by constructing a Hessian matrix, and one Hessian matrix is obtained for each pixel point in the image as follows:

$$H(f(x, y)) = \begin{bmatrix} \frac{\alpha^2 f}{\alpha x^2} & \frac{\alpha^2 f}{\alpha x \alpha y} \\ \frac{\alpha^2 f}{\alpha x \alpha y} & \frac{\alpha^2 f}{\alpha y^2} \end{bmatrix}.$$

In the above formula, $$\frac{\alpha^2 f}{\alpha x^2}$$

refers to a second-order partial derivative of an image target pixel point relative to x-axis, $$\frac{\alpha^2 f}{\alpha x \alpha y}$$

refers to a mixed partial derivative of the image target pixel point relative to x-axis and y-axis, and $$\frac{\alpha^2 f}{\alpha y^2}$$

refers to a second-order partial derivative of the image target pixel point relative to y-axis.

A discriminant of the Hessian matrix is as follow:

$$\det(H) = \frac{\alpha^2 f}{\alpha x^2} \frac{\alpha^2 f}{\alpha y^2} - \left(\frac{\alpha^2 f}{\alpha x \alpha y}\right)^2.$$

The discriminant of the Hessian matrix is a determinant corresponding to the Hessian matrix. All pixel points in the image are traversed sequentially, and the pixel points satisfying the following conditions are considered as feature points, that is, candidate points representing nucleus centroid coordinates:

$$\det(H) > hessian\_thresh.$$

In the above formula, hessian_thresh is an integer threshold indicating that nucleus candidate points selected in the nucleus localization algorithm of the disclosure shall satisfy that its corresponding Hessian matrix determinant value is greater than the threshold. In certain embodiments, the hessian_thresh is 55 in the disclosure.

2.3) Obtaining a set of centroids of real nuclei denoting as CentroidOfNucleus by integrating information from mers and CandidateNucleus, wherein each centroid in CentroidOfNucleus complies with a condition that the number of stable extreme regions comprising the centroid exceeds a preset parameter N. In certain embodiments, N=5.

3) Obtaining a set of square cell region of interest (ROI) images that are denoted as ROI images, wherein each square cell ROI image corresponds to a cell in the slide, and is determined with a Centroid_i as a center of the each square cell ROI image and a fixed length L as a side length of the each square cell ROI images. In certain embodiments, L=128.

Figure 8:
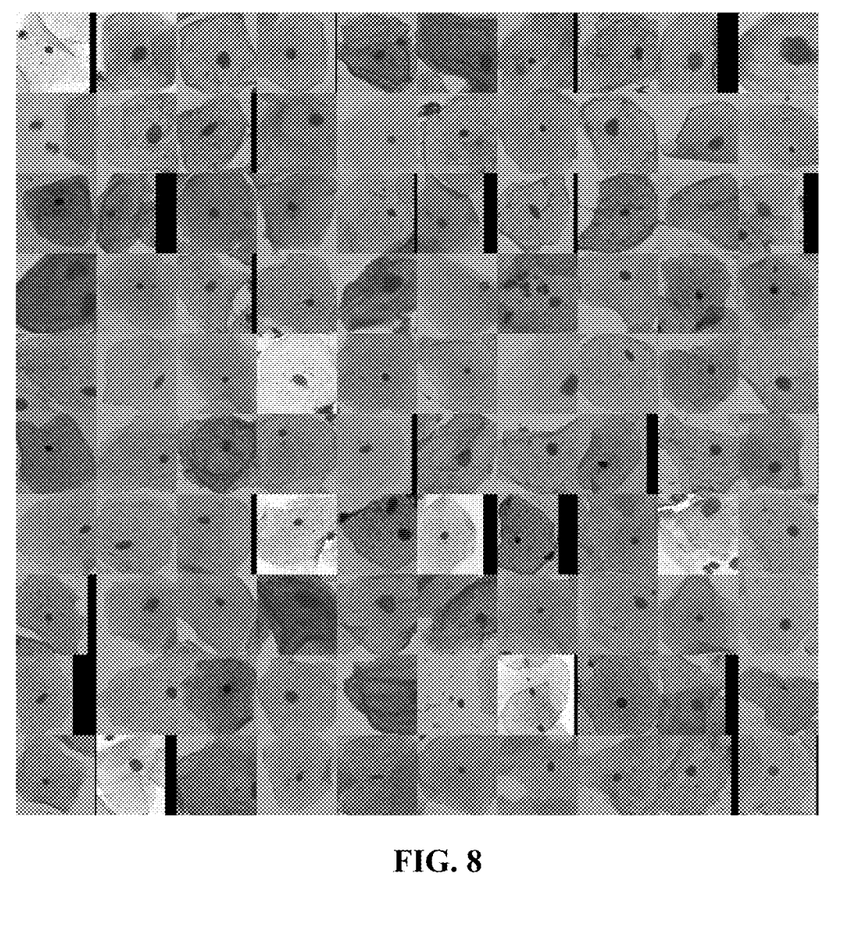
FIG. 8 is an exemplary diagram of input of a deep network model at a prediction stage according to one embodiment of the disclosure.

4) Grouping all cell images in the ROI_images into different groups based on sampling without replacement, wherein each group contains ROW×COLUMN cell images with preset ROW and COLUMN parameters; obtaining a set of splice images wherein a splice image with length being ROW×L and width being COLUMN×L is generated by randomly splicing the ROW×COLUMN cell images in the same group into ROW rows and COLUMN columns. In certain embodiments, the values of ROW and COLUMN are 10. The splice images are as shown in FIG. 8.

5) Classifying all cell images in the splice image simultaneously by using the splice image as an input of a trained deep neural network; and recognizing cells classified as abnormal categories.

Figure 2A:
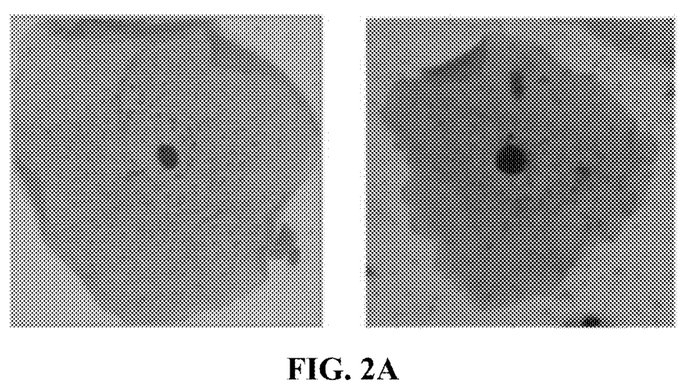
FIG. 2A is an exemplary diagram of a normal cell according to one embodiment of the disclosure.
Figure 2B:
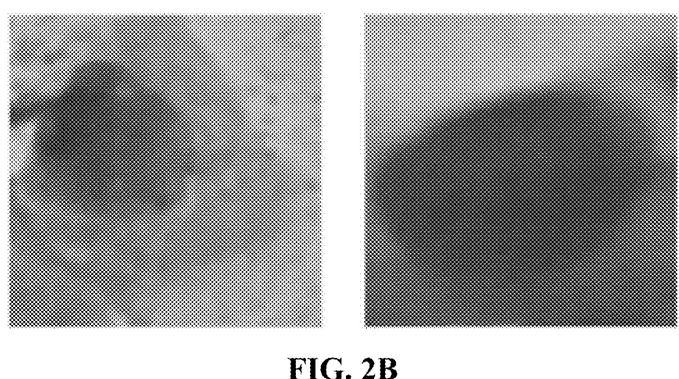
FIG. 2B is an exemplary diagram of an abnormal cell according to one embodiment of the disclosure.
Figure 2C:
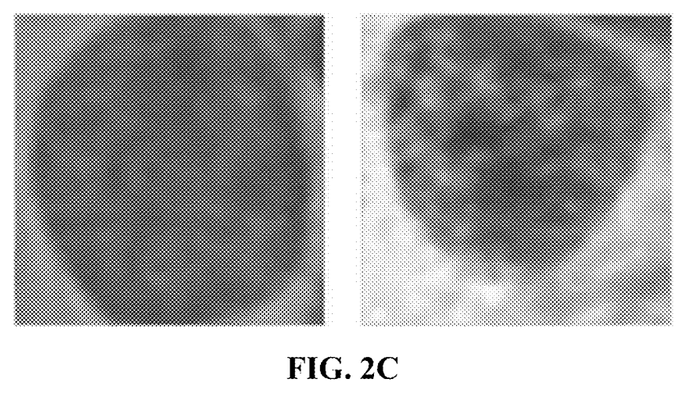
FIG. 2C is an exemplary diagram of a cancer cell according to one embodiment of the disclosure.

As shown in FIG. 2, in this example, the number of cell categories is 3: normal, precancerous and cancer respectively.

The process for training the deep neural network model comprises:

5.1) preparing a data set of cell images and performing data augmentation on the data set.

Figure 3:
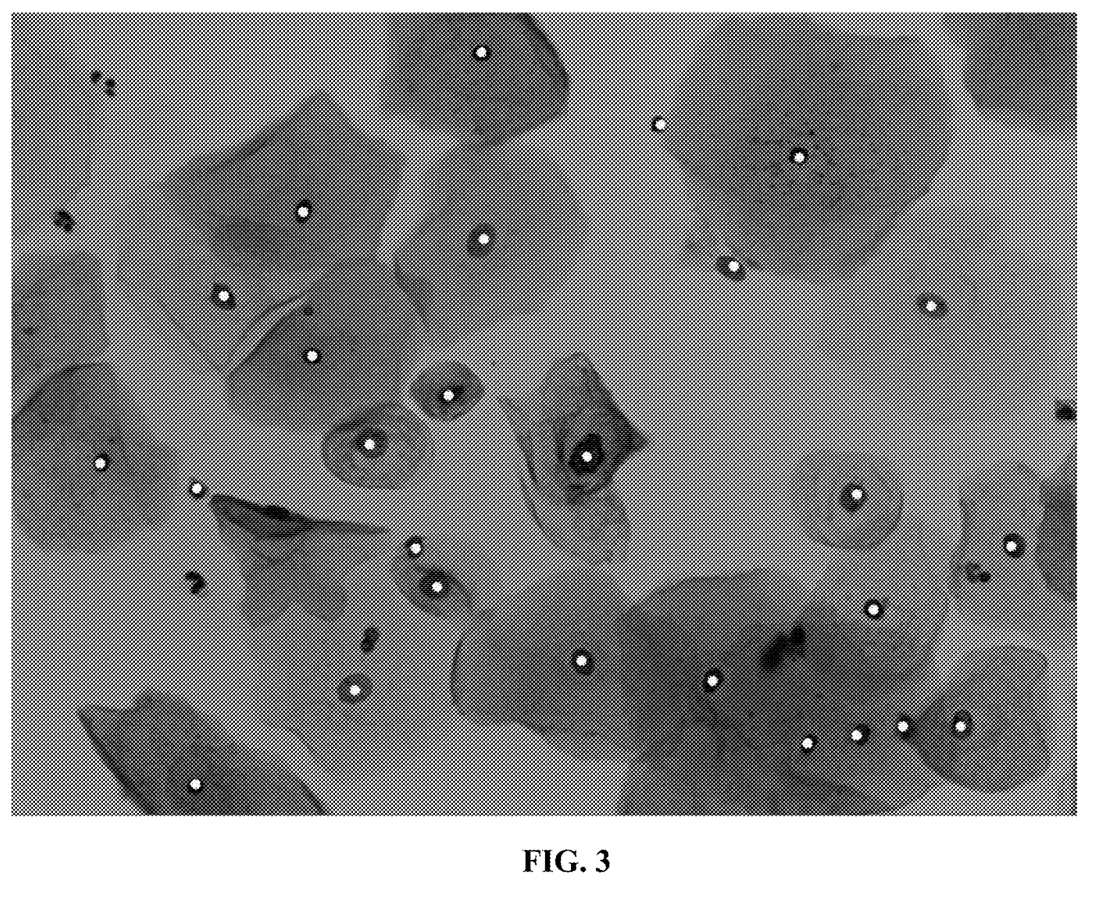
FIG. 3 is an effect diagram of automatic nucleus localization based on multi-source feature fusion according to one embodiment of the disclosure.
Figure 4:
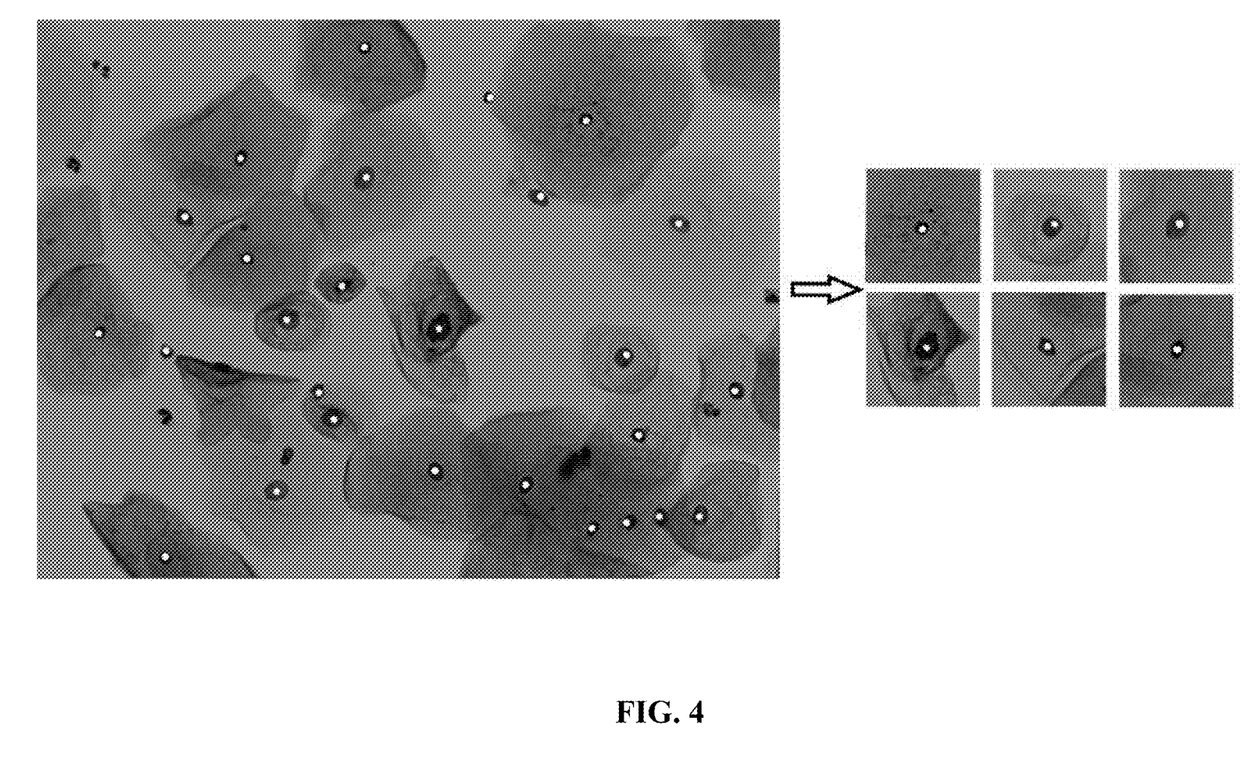
FIG. 4 is a schematic diagram of generating an ROI image by a nucleus centroid coordinate according to one embodiment of the disclosure.
Figure 5A:
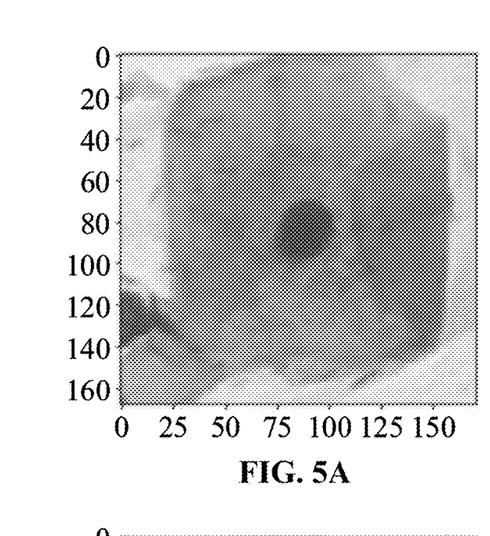
FIGS. 5A-5F are exemplary diagrams illustrating data augmentation of a single-cell image according to one embodiment of the disclosure.
Figure 5B:
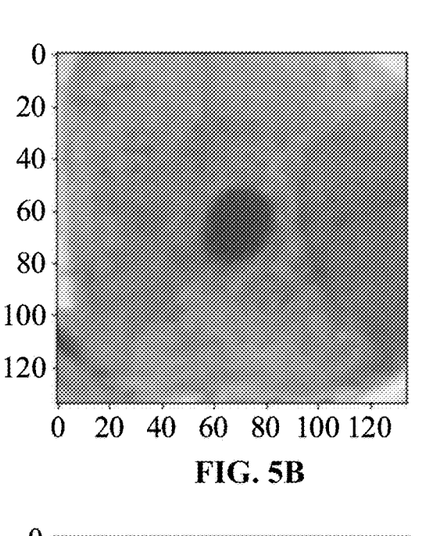
Figure 5C:
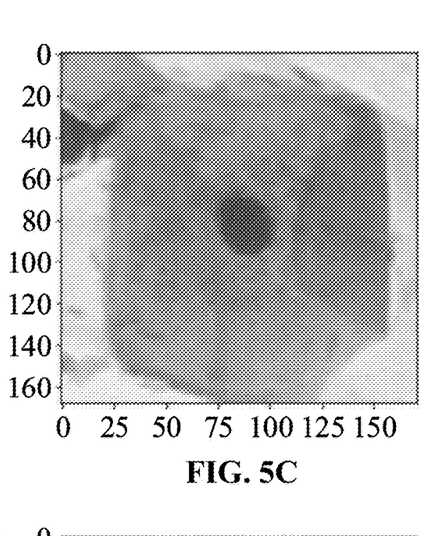
Figure 5D:
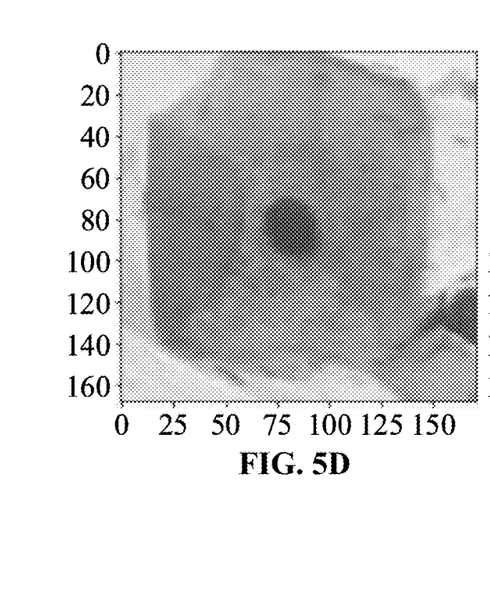
Figure 5E:
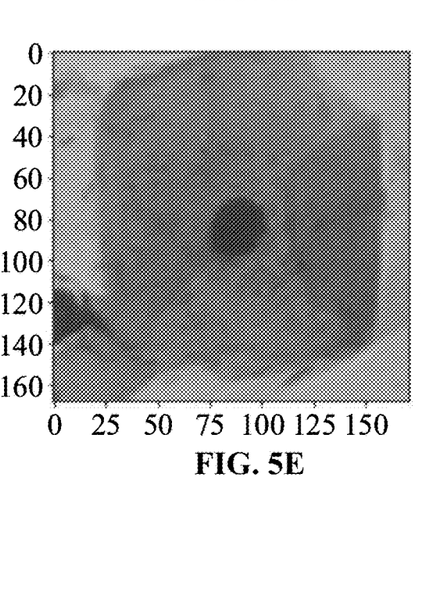
Figure 5F:
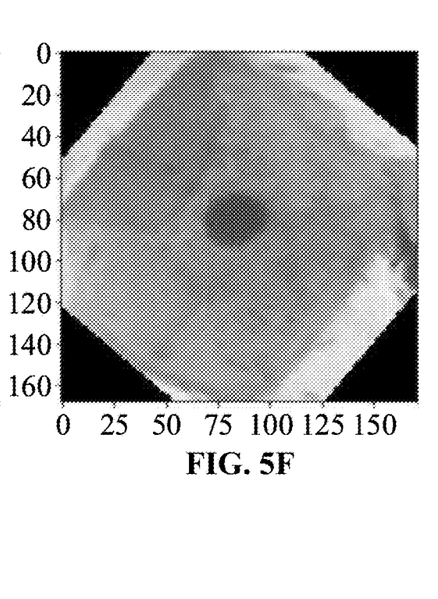

In this example, the preparation of the cell image data set comprises collecting original cytological slide images by scanning stained slides; automatically localizing nuclei for each cell slide image based on the feature fusion based localizing method (FIG. 3); generating the square cell ROI images with side lengths as L and the localized nuclei centroids as centers (FIG. 4); assigning class labels of the cell images via professional cytologists.

In this example, data augmentation is performed by a random combination of different data augmentation methods, comprising random clipping, horizontal flip, vertical flip, random light intensity transformation, and random angle rotation. The results of different types of data augmentations are as shown in FIGS. 5A-5F.

5.2) Generating a set of splice images as the training data, wherein each splice image is obtained by splicing ROW×COLUMN cell or the augmented images in the same slide image via randomly sampling without replacement, and with length being ROW×L and width being COLUMN×L.

Figure 6:
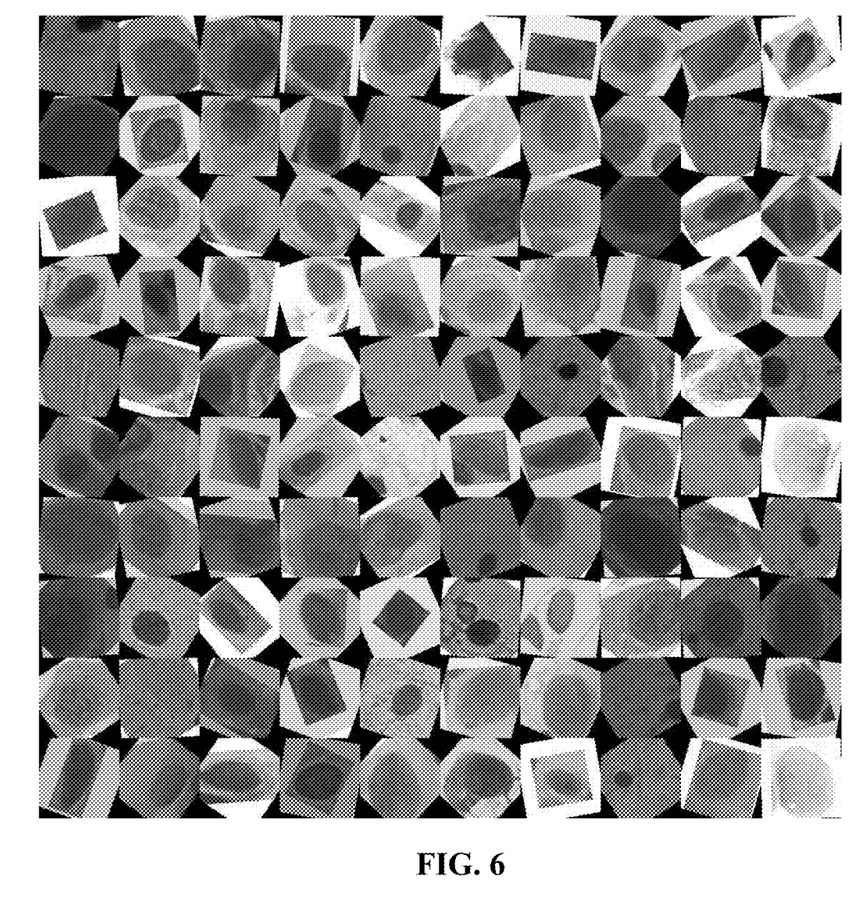
FIG. 6 is an exemplary diagram illustrating training data of a deep network model according to one embodiment of the disclosure.

In this example, all cell images in the same splice image are from the same slide image, and they are spliced horizontally or vertically according to their dimensions to form a splice image with length being ROW×L and width being COLUMN×L; the resolution of the splice image is increased while the number of channels remains unchanged. The splicing results are as shown in FIG. 6.

5.3) Constructing a deep neural network model by modifying the input and output layers of an existing Convolution Neural Network (CNN), such as Residual Neural Network (ResNet), wherein the input layer is modified from accepting cell images to accepting splice images of ROW×COLUMN cell images as input, and the output layer is modified from outputting classification result for one cell to outputting ROW×COLUMN classification results for ROW×COLUMN respectively.

Figure 9:
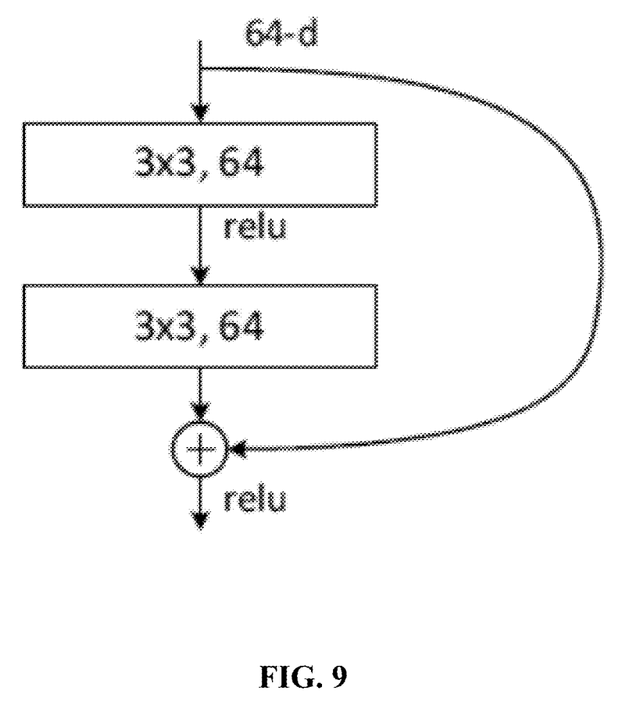
FIG. 9 is a structural schematic diagram illustrating a residual block used by a deep network model according to one embodiment of the disclosure.
Figure 10:
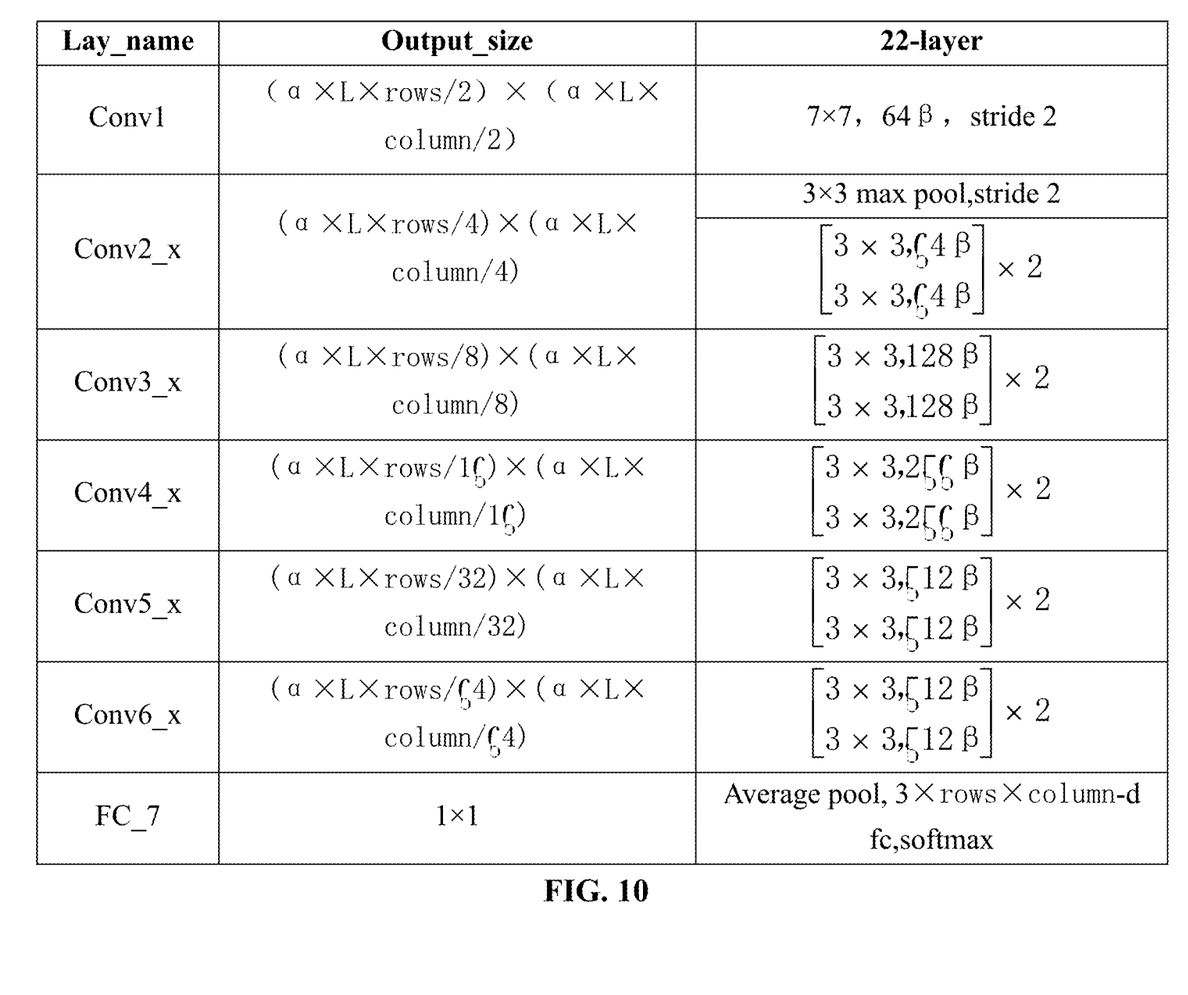
FIG. 10 is a structural diagram illustrating a deep network model according to one embodiment of the disclosure.

In this example, based on ResNet, the deep neural network model is added with two parameters $\alpha$ and $\beta$ based on ResNet to control a resolution and a width of a network structure so as to adapt to different numbers of rows and columns possibly adopted under different image splicing strategies. The structure of a residual block used by the deep network model of the disclosure is as shown in FIG. 9. A structural diagram of the deep network model of the disclosure is as shown in FIG. 10. In this example, the value of $\alpha$ is 1, and the value of $\beta$ is 1.

5.4) Defining a total loss function of the deep neural network model as the sum of cross-entropy loss of ROW×COLUMN cell involved in the same splice image.

Figure 7:
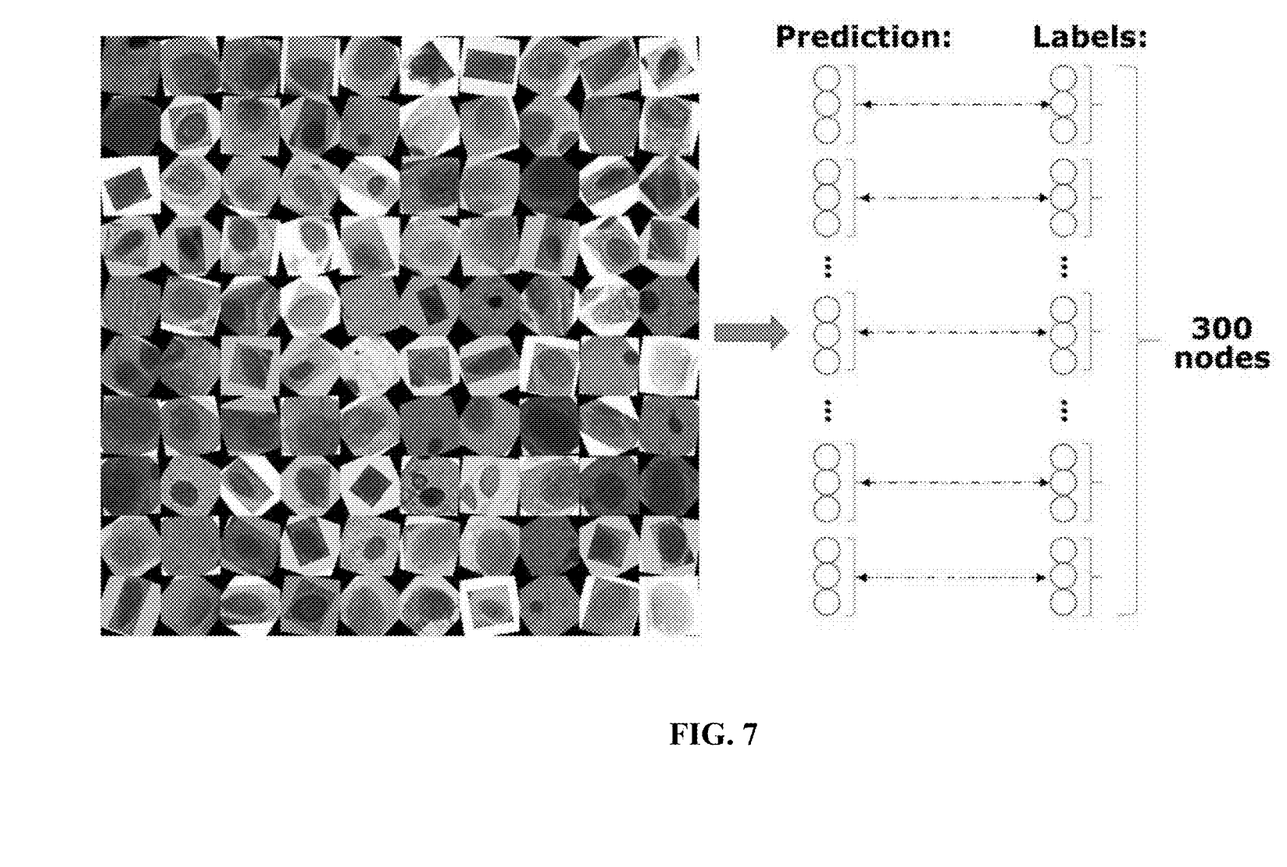
FIG. 7 is a schematic diagram illustrating an input label and a prediction result of a deep network model according to one embodiment of the disclosure.

In this example, all labels of all ROI images are in the form of traditional one-hot. That is, for k classification task, the label of the sample is a vector with a length being k. In the vector, there is only one position with a value being 1 and other positions with a value being 0. The label of a cell splice image is obtained by splicing labels of all cell images participating in splicing. FIG. 7 is a schematic diagram illustrating an input label and a prediction result of a deep network model according to the disclosure. The total loss function is defined as the sum of cross-entropy of ROW×COLUMN cell images participating in splicing, wherein the real label and the prediction label of a cell image are denoted as $label_i$ and $prediction_i$ respectively, and thus the total loss function is defined as follows:

$$Cost = \Sigma_{i=1}^{rows \times column} cross\_entropy(prediction_i, label_i);$$

$$cross\_entropy(q,p) = -\Sigma_{i=1}^{k} p_i \log(q_i).$$

In the above formula, k refers to the number of categories of classification.

5.5) Randomly splitting the training data as training set and validation set according to a predetermined ratio; training the deep neural network by using the stochastic gradient descent algorithm to find the optimal network parameters minimizing the total loss function.

In this example, a learning rate decays exponentially with adoption of an Adam optimizer. In certain embodiments, the initial learning rate is 0.001, EPOCH is 160, batch_size is 128, the decay step length of the learning rate is 8000, and the single decay rate of the learning rate is 0.94.

Classification effect of the method applied to a published cervical pathological cell data set is shown as follows:

(1) Introduction of the data set: for ensuring authoritativeness of experimental results, a Danish data set HERLEV published internationally is used to perform model evaluation, where the HERLEV data set includes a total of 917 single cervical cell images. In the disclosure, the data set is randomly divided into a training set and a validation set according to a proportion of 8:2. Since the number of cells is small in both the training set and the validation set, data augmentation is performed for the training set and the validation set respectively, so that each cell image is augmented to 6 times the original number (the augmentation manner includes horizontal flipping, vertical flipping, main diagonal flipping, random light intensity change and random angle rotation of original image). After data augmentation, a total data amount of the training set is 4398, with the numbers of different categories being normal samples 1212, precancerous samples 2466 and cancer samples 720 respectively; a total data amount of the validation set is 1104, with the numbers of different categories being normal samples 240, precancerous samples 684 and cancer samples 180 respectively. In this example, an F1 score of the validation set is used as an optimal indicator of the deep neural network model; after model training is completed, confusion matrixes of the training set and the validation set are as shown respectively in Tables 1 and 2.

TABLE 1

Confusion matrix of the training set

| Real label | Prediction result | | |
| --- | --- | --- | --- |
| | Normal | Precancerous | Cancer |
| Normal | 1077 | 110 | 25 |
| Precancerous | 48 | 2330 | 88 |
| Cancer | 18 | 358 | 344 |

TABLE 2

Confusion matrix of the validation set

| Real label | Prediction result | | |
| --- | --- | --- | --- |
| | Normal | Precancerous | Cancer |
| Normal | 193 | 41 | 6 |
| Precancerous | 21 | 623 | 40 |
| Cancer | 10 | 80 | 90 |

Further, the classification model obtained with the single-cell image as the input of the deep network model through training is referred to as a single image model, and the classification model trained after image splicing is performed in the disclosure is referred to as an image splicing model. As a comparison, the single image model is trained based on the training set, and the validation set and network structure as shown above. Similarly, the F1 score of the validation set is used as the optimal indicator of the deep neural network model, and the final confusion matrixes of the training set and the validation set of the single image model are as shown respectively in Tables 3 and 4.

TABLE 3

Confusion matrix of the training set of the single image model

| Real label | Prediction result | | |
| --- | --- | --- | --- |
| | Normal | Precancerous | Cancer |
| Normal | 836 | 218 | 158 |
| Precancerous | 115 | 1992 | 359 |
| Cancer | 27 | 232 | 461 |

TABLE 4

Confusion matrix of the validation set of the single image model

| Real label | Prediction result | | |
| --- | --- | --- | --- |
| | Normal | Precancerous | Cancer |
| Normal | 168 | 31 | 41 |
| Precancerous | 30 | 503 | 151 |
| Cancer | 1 | 59 | 120 |

To compare the image splicing model of the disclosure with the traditional single image model, performance differences of the two models are compared by using the following five indicators: a cross entropy loss function of the training set Train_Cost, a cross entropy loss function of the validation set Val_Cost, an accuracy rate of the training set Train_Acc, an accuracy rate of the validation set Val_Acc, and the F1 score of the validation set Val_F1. Comparison results are as shown in Table 5.

TABLE 5

Performance comparison of the image splicing model and the traditional single cell image model

| Model category | Model indicator | | | | |
| --- | --- | --- | --- | --- | --- |
| | Train_Cost | Val_Cost | Train_Acc | Val_Acc | Val_F1 |
| Single cell image model | 0.3001 | 0.3329 | 0.7478 | 0.7165 | 0.6803 |
| Image splicing model | 0.1545 | 0.1872 | 0.8529 | 0.8207 | 0.7580 |

As can be seen from Table 5, compared with the traditional single image model, the image splicing model of the disclosure is greatly improved in classification performance of both the training set and the validation set. For the image splicing model of the disclosure, the accuracy rate of the training set reaches 85.29%, which is increased by close to 11 percentage points over the single image model; the accuracy rate of the validation set reaches 82.07% which is increased by close to 11 percentage points over the single image model; the F1 score of the validation set reaches 75.80% which is increased by more than 7 percentage points over the single image model. In addition, for diagnosis efficiency, time for recognizing the single-cell image by the image splicing model according to the disclosure is 0.61 milliseconds which is twice the time of the single image model. Experimental results show that the method according to the disclosure is feasible and can greatly improve detection rate, recognition precision and recognition efficiency of abnormal cells, thereby bringing a great social practical value.

It will be obvious to those skilled in the art that changes and modifications may be made, and therefore, the aim in the appended claims is to cover all such changes and modifications.

What is claimed is:

1. A method, comprising:
   1) scanning a slide using a digital pathological scanner and obtaining a cytological slide image;
   2) obtaining a set of centroid coordinates of all nuclei that is denoted as CentroidOfNucleus by automatically localizing nuclei of all cells in the cytological slide image using a feature fusion based localizing method;
   3) obtaining a set of cell square region of interest (ROI) images that are denoted as ROI images, wherein each square cell ROI image corresponds to a cell in the slide, and is determined with a Centroid i as a center of the each square cell ROI image and a fixed length L as a side length of the each square cell ROI image;
   4) grouping all cell images in the ROI images into different groups based on sampling without replacement, wherein each group contains ROW×COLUMN cell images with preset ROW and COLUMN parameters; obtaining a set of splice images wherein a splice image with length being ROW×L and width being COLUMN×L is generated by randomly splicing the ROW×COLUMN cell images in the same group into ROW rows and COLUMN columns; and
   5) classifying all cell images in the splice image simultaneously by using the splice image as an input of a trained deep neural network; and recognizing cells classified as abnormal categories;

wherein in 2), nuclei of all cells in the cytological slide image are automatically localized by using a feature fusion based localizing method, which comprises:
   2.1) obtaining a set of stable extreme regions denoting as msers by automatically localizing all stable extreme regions in the cytological slide image based on a maximally stable extreme region (MSER) algorithm, each region in the msers complies with a condition that an area thereof reaches a stable maximum and is within a given threshold range;
   2.2) localizing a set of key points in the cytological slide image based on a SpeededUp Robust Features (SURF) algorithm and denoting the set of key points as CandidateNucleus, each key point represents a centroid of a candidate nucleus; and
   2.3) obtaining a set of centroids of real nuclei denoting as CentroidOfNucleus by integrating information from msers and CandidateNucleus, wherein each centroid in CentroidOfNucleus complies with a condition that a number of stable extreme regions comprising the centroid exceeds a preset parameter N.

2. The method of claim 1, wherein in 5), the cells are classified as 3 categories: normal, precancerous and cancer.

3. The method of claim 1, wherein in 5), a process for training a deep network model comprises:
   5.1) preparing a data set of cell images and performing data augmentation on the data set, wherein the preparation of the data set of cell images comprises collecting original cytological slide images by scanning stained slides; automatically localizing nuclei for each cell slide image based on the feature fusion based localizing method; generating the square cell ROI images with side lengths as L and the localized nuclei centroids as centers; and assigning class labels of the cell images via professional cytologists;
   5.2) generating a set of splice images as the training data, wherein each splice image is obtained by splicing ROW×COLUMN cell or the augmented images in the same slide image via randomly sampling without replacement, and with length being ROW×L and width being COLUMN×L;
   5.3) constructing a deep neural network model by modifying an input layer and an output layer of an existing Convolution Neural Network (CNN), wherein the input layer is modified from accepting cell images to accepting splice images of ROW×COLUMN cell images as input, and the output layer is modified from outputting classification result for one cell to outputting ROW×COLUMN classification results for ROW×COLUMN respectively;
   5.4) defining a total loss function of the deep neural network model as the sum of cross-entropy loss of ROW×COLUMN cell involved in the same splice image; and
   5.5) randomly splitting the training data as training set and validation set according to a predetermined ratio; training the deep neural network by using the stochastic gradient descent algorithm to find the optimal network parameters minimizing the total loss function.

4. The method of claim 3, wherein in 5.1), the data augmentation is performed by a random combination of different data augmentation methods, comprising random clipping, horizontal flip, vertical flip, random light intensity transformation, and random angle rotation.

5. The method of claim 3, wherein in 5.2), all cell images in the same splice image are from the same slide image, and are spliced horizontally or vertically according to their dimensions to form a splice image with length being ROW×L and width being COLUMN×L; and a resolution of the splice image is increased while a number of channels thereof remains unchanged.

6. The method of claim 3, wherein in 5.3), the deep neural network model is added with two parameters α and β based on Residual Neural Network (ResNet) to control a resolution and a width of a network structure so as to adapt to different numbers of rows and columns possibly adopted under different image splicing strategies.

7. The method of claim 3, wherein in 5.4), a label of a cell splice image is obtained by splicing labels of all cell images participating in splicing;
   the total loss function is defined as the sum of cross-entropy of ROW×COLUMN cell images participating in splicing, wherein a real label and a prediction label of a cell image are denoted as $label_i$ and $prediction_i$ respectively, and thus the total loss function is defined as follows:

$Cost = \Sigma_{i=1}^{rows \times column} cross\_entropy(prediction_i, label_i);$ $cross\_entropy(q,p) = -\Sigma_{i=1}^{k} p_i \log(q_i);$ and k refers to a number of categories of classification.

8. A method, comprising:
   1) scanning a slide using a digital pathological scanner and obtaining a cytological slide image;
   2) obtaining a set of centroid coordinates of all nuclei that is denoted as CentroidOfNucleus by automatically localizing nuclei of all cells in the cytological slide image using a feature fusion based localizing method;
   3) obtaining a set of cell square region of interest (ROI) images that are denoted as ROI images, wherein each square cell ROI image corresponds to a cell in the slide, and is determined with a Centroid i as a center of the each square cell ROI image and a fixed length L as a side length of the each square cell ROI image;

4) grouping all cell images in the ROI images into different groups based on sampling without replacement, wherein each group contains ROW×COLUMN cell images with preset ROW and COLUMN parameters; obtaining a set of splice images wherein a splice image with length being ROW×L and width being COLUMN×L is generated by randomly splicing the ROW×COLUMN cell images in the same group into ROW rows and COLUMN columns; and 5) classifying all cell images in the splice image simultaneously by using the splice image as an input of a trained deep neural network; and recognizing cells classified as abnormal categories;

wherein in 5), a process for training the deep neural network model comprises:

5.1) preparing a data set of cell images and performing data augmentation on the data set, wherein the preparation of the data set of cell images comprises collecting original cytological slide images by scanning stained slides; automatically localizing nuclei for each cell slide image based on the feature fusion based localizing method; generating the square cell ROI images with side lengths as L and the localized nuclei centroids as centers; and assigning class labels of the cell images via professional cytologists;

5.2) generating a set of splice images as the training data, wherein each splice image is obtained by splicing ROW×COLUMN cell or the augmented images in the same slide image via randomly sampling without replacement, and with length being ROW×L and width being COLUMN×L;

5.3) constructing a deep neural network model by modifying an input layer and an output layer of an existing Convolution Neural Network (CNN), wherein the input layer is modified from accepting cell images to accepting splice images of ROW×COLUMN cell images as input, and the output layer is modified from outputting classification result for one cell to outputting ROW×COLUMN classification results for ROW×COLUMN respectively;

5.4) defining a total loss function of the deep neural network model as the sum of cross-entropy loss of ROW×COLUMN cell involved in the same splice image; and 5.5) randomly splitting the training data as training set and validation set according to a predetermined ratio; training the deep neural network by using the stochastic gradient descent algorithm to find the optimal network parameters minimizing the total loss function.

9. The method of claim 8, wherein in 5.1), the data augmentation is performed by a random combination of different data augmentation methods, comprising random clipping, horizontal flip, vertical flip, random light intensity transformation, and random angle rotation.

10. The method of claim 8, wherein in 5.2), all cell images in the same splice image are from the same slide image, and are spliced horizontally or vertically according to their dimensions to form a splice image with length being ROW×L and width being COLUMN×L; and a resolution of the splice image is increased while a number of channels thereof remains unchanged.

11. The method of claim 8, wherein in 5.3), the deep neural network model is added with two parameters α and β based on Residual Neural Network (ResNet) to control a resolution and a width of a network structure so as to adapt to different numbers of rows and columns possibly adopted under different image splicing strategies.

12. The method of claim 8, wherein in 5.4), a label of a cell splice image is obtained by splicing labels of all cell images participating in splicing;

the total loss function is defined as the sum of cross-entropy of ROW×COLUMN cell images participating in splicing, wherein a real label and a prediction label of a cell image are denoted as $label_i$ and $prediction_i$ respectively, and thus the total loss function is defined as follows:

$$Cost=\Sigma_{i=1}^{rows \times column} cross\_entropy(prediction_i, label_i);$$

$$cross\_entropy(q,p)=-\Sigma_{i=1}^{k} p_i \log(q_i); \text{ and}$$

k refers to a number of categories of classification.

13. A method, comprising:

1) scanning a slide using a digital pathological scanner and obtaining a cytological slide image;

2) obtaining a set of centroid coordinates of all nuclei that is denoted as CentroidOfNucleus by automatically localizing nuclei of all cells in the cytological slide image using a feature fusion based localizing method;

3) obtaining a set of cell square region of interest (ROI) images that are denoted as ROI images, wherein each square cell ROI image corresponds to a cell in the slide, and is determined with a Centroid i as a center of the each square cell ROI image and a fixed length L as a side length of the each square cell ROI image;

4) grouping all cell images in the ROI images into different groups based on sampling without replacement, wherein each group contains ROW×COLUMN cell images with preset ROW and COLUMN parameters; obtaining a set of splice images wherein a splice image with length being ROW×L and width being COLUMN×L is generated by randomly splicing the ROW×COLUMN cell images in the same group into ROW rows and COLUMN columns; and 5) classifying all cell images in the splice image simultaneously by using the splice image as an input of a trained deep neural network; and recognizing cells classified as abnormal categories;

wherein in 5), the cells are classified as 3 categories: normal, precancerous and cancer; and a process for training a deep network model comprises:

5.1) preparing a data set of cell images and performing data augmentation on the data set, wherein the preparation of the data set of cell images comprises collecting original cytological slide images by scanning stained slides; automatically localizing nuclei for each cell slide image based on the feature fusion based localizing method; generating the square cell ROI images with side lengths as L and the localized nuclei centroids as centers; and assigning class labels of the cell images via professional cytologists;

5.2) generating a set of splice images as the training data, wherein each splice image is obtained by splicing ROW×COLUMN cell or the augmented images in the same slide image via randomly sampling without replacement, and with length being ROW×L and width being COLUMN×L;

5.3) constructing a deep neural network model by modifying an input layer and an output layer of an existing Convolution Neural Network (CNN), wherein the input layer is modified from accepting cell images to accepting splice images of ROW×COLUMN cell images as input, and the output layer is modified from outputting classification result for one cell to outputting ROW× COLUMN classification results for ROW×COLUMN respectively;

5.4) defining a total loss function of the deep neural network model as the sum of cross-entropy loss of ROW×COLUMN cell involved in the same splice image; and 5.5) randomly splitting the training data as training set and validation set according to a predetermined ratio; training the deep neural network by using the stochastic gradient descent algorithm to find the optimal network parameters minimizing the total loss function.

14. The method of claim 13, wherein in 5.1), the data augmentation is performed by a random combination of different data augmentation methods, comprising random clipping, horizontal flip, vertical flip, random light intensity transformation, and random angle rotation.

15. The method of claim 13, wherein in 5.2), all cell images in the same splice image are from the same slide image, and are spliced horizontally or vertically according to their dimensions to form a splice image with length being ROW×L and width being COLUMN×L; and a resolution of the splice image is increased while a number of channels thereof remains unchanged.

16. The method of claim 13, wherein in 5.3), the deep neural network model is added with two parameters α and β based on Residual Neural Network (ResNet) to control a resolution and a width of a network structure so as to adapt to different numbers of rows and columns possibly adopted under different image splicing strategies.

17. The method of claim 13, wherein in 5.4), a label of a cell splice image is obtained by splicing labels of all cell images participating in splicing;

the total loss function is defined as the sum of cross-entropy of ROW×COLUMN cell images participating in splicing, wherein a real label and a prediction label of a cell image are denoted as $label_i$ and $prediction_i$ respectively, and thus the total loss function is defined as follows:

$$Cost = \Sigma_{i=1}^{rows \times column} cross\_entropy(prediction_i, label_i);$$

$$cross\_entropy(q,p) = -\Sigma_{i=1}^{k} p_i \log(q_i); \text{ and}$$

k refers to a number of categories of classification.

* * * * *